United States Patent
Shimotomai et al.

(10) Patent No.: US 8,198,821 B2
(45) Date of Patent: Jun. 12, 2012

(54) SOLAR SIMULATOR

(75) Inventors: Mitsuhiro Shimotomai, Okazaki (JP);
Yoshihiro Shinohara, Okazaki (JP);
Katsumi Irie, Okazaki (JP); Osamu Honaga, Okazaki (JP)

(73) Assignee: Nisshinbo Industries, Inc., Okazaki, Aichi (JP)

( * ) Notice: Subject to any disclaimer, the term of this patent is extended or adjusted under 35 U.S.C. 154(b) by 760 days.

(21) Appl. No.: 12/124,711

(22) Filed: May 21, 2008

(65) Prior Publication Data
US 2008/0298043 A1    Dec. 4, 2008

(30) Foreign Application Priority Data
May 31, 2007 (JP) ................... 2007-145173

(51) Int. Cl.
*H05B 37/00* (2006.01)
(52) U.S. Cl. .............. 315/241 P; 315/173; 315/291
(58) Field of Classification Search .............. 315/151, 315/173, 241 R, 241 P, 241 S, 291, 307; 396/57, 396/157, 159, 173
See application file for complete search history.

(56) References Cited

U.S. PATENT DOCUMENTS

| 5,204,586 | A | * | 4/1993 | Moore | 315/159 |
| 5,432,410 | A | * | 7/1995 | Yamada et al. | 315/241 P |
| 5,602,446 | A | * | 2/1997 | Kolber et al. | 315/241 P |
| 5,668,445 | A | * | 9/1997 | Matsui | 315/241 P |
| 6,034,486 | A | * | 3/2000 | Fukui | 315/241 P |
| 6,167,199 | A | * | 12/2000 | Fukui | 396/57 |
| 6,498,901 | B2 | * | 12/2002 | Kawasaki et al. | 396/157 |
| 2002/0044774 | A1 | * | 4/2002 | Kawasaki et al. | 396/155 |
| 2003/0001961 | A1 | * | 1/2003 | Yoshida et al. | 348/345 |

FOREIGN PATENT DOCUMENTS

| EP | 1 734 373 A2 | 12/2006 |
| EP | 1 771 049 A2 | 4/2007 |
| JP | 2886215 B2 | 7/1991 |
| JP | 2007-088419 | 4/2007 |
| JP | 2007-128861 | 5/2007 |

* cited by examiner

*Primary Examiner* — Tung X Le
(74) *Attorney, Agent, or Firm* — Apex Juris, PLLC; Tracy M. Heims

(57) ABSTRACT

To provide the solar simulator that facilitates making the flash light emitted from the lamp into the desirable irradiance waveform. In the solar simulator 1, the controller 12, according to the control pattern preset to maintain the flash light F emitted from the xenon lamp 14 at the target irradiance for a certain period of time, controls the electric current, which is discharged from the condenser assembly 26 and flowing through the xenon lamp 14, by performing the switching drive on the power switching element 20.

11 Claims, 5 Drawing Sheets

SOLAR SIMULATOR

CROSS-REFERENCE TO RELATED APPLICATION(S) AND CLAIM OF PRIORITY

The present application claims the benefit under 35 U.S.C. section 119(a) of Japanese Patent Application filed in the Japan Patent Office on May 31, 2007 and assigned serial number 2007-145173, the disclosure of which is incorporated herein by reference.

FIELD OF INVENTION

The present invention relates to a solar simulator which irradiates pseudo sunlight to an object such as photovoltaic devices, (i.e., a pseudo sunlight irradiator) for measuring current voltage characteristics of the object photovoltaic devices.

BACKGROUND OF THE INVENTION

Conventionally, a type of a known solar simulator is such that flash light, which is emitted from a xenon lamp, is irradiated to the photovoltaic devices as the pseudo sunlight in case of measuring characteristics of electric current voltage of the photovoltaic devices.

Patent Document 1 discloses a technology, in which a power supply circuit with multiple condensers, which are connected in parallel via coils, is utilized to a flatten flash light irradiance waveform emitted from the xenon lamp and to secure the measuring time for the characteristics of the photovoltaic devices.

Also, Patent Document 2 discloses a technology of using a power supply circuit with a capacitor, which outputs electric discharge sustaining voltage, to make the xenon lamp to emit long pulse and to secure the measuring time for the characteristics of the photovoltaic devices.

Furthermore, Patent Document 3 discloses a technology for maintaining a continuous lighting xenon lamp at low irradiance and controlling the same to be high irradiance to measure the characteristics of the photovoltaic devices at a flat portion of the irradiance waveform.

[Patent Document 1] Japanese Unexamined Patent Publication No. 2007-088419
[Patent Document 2] Japanese Unexamined Patent Publication No. 2007-128861
[Patent Document 3] Japanese Patent No. 2886215

However, Patent Document 1 has the following problems:
(1) when the power supply circuit employed in Patent Document 1 is used, in order to make the flash light emitted from the lamp into a predetermined irradiance waveform, detail configuration of the power supply circuit such as the number and capacity of condensers need to be defined. Also, whenever the irradiance waveform is attempted to be changed, the configuration of the power supply circuit needs to be redefined; and
(2) in order to flatten the irradiance waveform, numerous coils and condensers are needed to be arranged, which increases the cost thereof and requires a large space.

Also, when the power supply circuit employed in Patent Document 2 is used, since general electric current control circuits generate a withstand pressure problem, luminous voltage of the lamp needs to be low. The lamp can be short for lowering the luminous voltage of the lamp; however, a shorter lamp makes it difficult to secure sufficient quantity of light. In addition, when attempting to secure the sufficient quantity of light with the short lamp, the large amount of electric current is required, and therefore general electric current control circuits becomes incapable of performing satisfactory.

Furthermore, when measuring the characteristics of the photovoltaic devices utilizing continuous emission as in Patent Document 3, emission for a long period of time shortens the life of lamp and optical parts.

SUMMARY OF THE INVENTION

The present invention was made in consideration of the above-facts, and an object thereof is to provide the solar simulator which facilitates making the flash light emitted from the lamp into the desirable irradiance waveform.

For the purpose of resolving the above-identified problems, the solar simulator of the present invention is characterized by having a condenser assembly, a lamp which emits a flash light by electric current discharged from the condenser assembly; and a controller which performs feedforward control of the amount of electric current flowing through the lamp according to a preset control pattern for maintaining predetermined irradiance of the flash light for a predetermined period of time.

According to the present invention, performing the feedforward control of the amount of electric current flowing through the lamp following the pre-set control pattern, facilitates making the flash light emitted from the lamp into the desirable irradiance waveform. Also, in this case, the condenser assembly does not need special configurations as required in the above-described Patent Documents 1 and 2.

Still further, one manner of the present invention can provide the solar simulator in which the solar simulator further comprises a detector which detects the flash light irradiance, and the controller performs feedback control of the amount of electric current flowing through the lamp according to the detected irradiance for maintaining the predetermined flash light irradiance. According to this state, the irradiance of the flash light can be stabilized at the predetermined irradiance.

Still further, one manner of the present invention can provide the solar simulator which further has a correcting section which corrects the control pattern based on the past control history of the controller. According to this manner, regardless of the change in the characteristics of the lamp due to such as secular change, the present invention can offer an appropriate control pattern.

Still further, one manner of the present invention can provide the solar simulator, in which the control pattern is configured to increase the amount of electric current flowing through the lamp over time from the time when the flash light irradiance drops to a predetermined irradiance after reaching the maximum irradiance. According to this manner, the irradiance of the flash light tending to attenuate can be maintained at the predetermined irradiance and therefore controlling becomes easier in comparison to when maintaining the irradiance of the increasing flash light F.

Still further, one manner of the present invention can provide the solar simulator, in which the control pattern is configured to maintain the flash light at a first irradiance for a predetermined period of time and then to maintain the flash light at a second irradiance with lower irradiance than the first irradiance for a predetermined period of time. According to this manner, one time lamp emission enables multiple measurements of the characteristics with different irradiance conditions. That is, although in the traditional solar simulators, when trying to measure the characteristics of the photovoltaic devices under the different irradiance conditions, the lamp needs to emit light numerous times as changing such as the condenser settings, according to the present invention, one time lamp emission enables the measurements of the characteristics under different irradiance conditions.

Still further, one manner of the present invention can provide the solar simulator in which the controller performs switching control of a power switching element arranged in an electric current path including the lamp. According to this manner, the electric current flowing through the lamp can be controlled with high speed switching.

Yet further, one manner of the present invention can provide the solar simulator, in which the condenser assembly is capable of switching a condenser assembly capacity. According to this manner, the condenser assembly capacity can be selected based on the time for maintaining the irradiance of the flash light.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE PREFERRED EMBODIMENT

Embodiments of the present invention will be explained with reference to the drawings.

Figure 1:
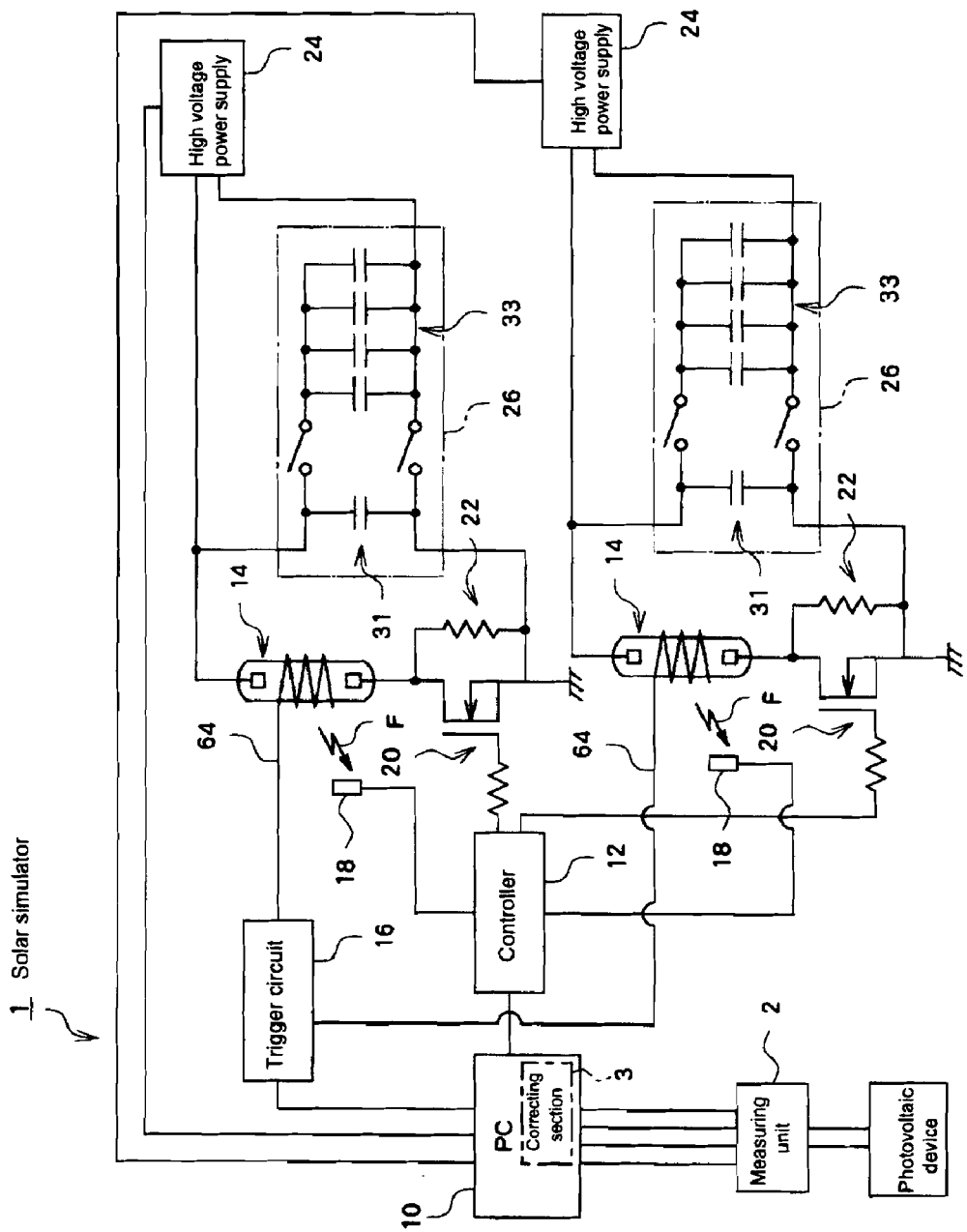
FIG. 1 is a block view of the solar simulator relating to one embodiment of the present invention.

FIG. 1 is a block view of one example of the solar simulator (pseudo sunlight irradiator) relating to the first embodiment of the present invention.

A solar simulator 1 includes a measuring unit 2, a computer (hereafter, PC) 10, a controller (controlling device) 12, a xenon lamp 14, a trigger circuit 16, an irradiance sensor (detector) 18, a power switching element 20, a high voltage power supply 24, and a condenser assembly 26.

The solar simulator 1 uses the flash light F emitted from the xenon lamp 14 to irradiate the photovoltaic devices which is to be measured and is mounted on the solar simulator 1 so as to measure the characteristics of the electric current voltage. An object to be measured is not limited to the photovoltaic devices, and other photoelectric exchange element can be to be measured.

The measuring unit 2, when measuring the characteristics of the electric current voltage of the photovoltaic devices set to be measured, processes electric current detection signals and voltage detection signals, which are output from the photovoltaic devices. This measuring unit 2 is a conventional unit and the detail explanation thereof is omitted here.

In addition, the solar simulator 1 includes multiple xenon lamps 14 and is equipped with a irradiance sensor 18, a power switching element 20, a high voltage power supply 24, and the condenser assembly 26, which correspond to the respective xenon lamp 14.

The xenon lamp 14 has an electric discharge tube in which the xenon gas is sealed and has a winding 64 extending from the trigger circuit 16 wound therearound. Furthermore, the voltage is applied to the xenon lamp 14 by the accumulated condenser assembly 26.

This xenon lamp 14, when the trigger signals of high voltage are output from the trigger circuit 16 to the winding 64, is induced to discharge due to ionization of the xenon gas. The electric current rapidly flows therein from the condenser assembly 26, and the xenon gas emits light. As such, the flash light F (stroboscopic light) is defined as the light emitted instantly due to the discharge.

The flash light F to be emitted from the xenon lamp 14 is characterized in that the spectrum is close to the sunlight and is preferable to be used as pseudo sunlight. Furthermore, the solar simulator 1 is not necessarily equipped with the xenon lamp 14, and other rare gas lamp may be used.

The trigger circuit 16 includes a transformer and outputs trigger signals of high voltage to winding 64 wound around the xenon lamp 14. This trigger circuit 16 outputs the trigger signals as controlled by PC 10.

The irradiance sensor 18 detects the irradiance of the flash light F emitted from the xenon lamp 14 to output the detected signals to a controller 12.

The condenser assembly 26 includes the condenser 31 and is accumulated by the high voltage power source 24. The condenser assembly 26 applies the voltage to the xenon lamp 14 and outputs the electric current when the xenon lamp 14 discharges. The high voltage power supply 24 accumulates the condenser assembly 26 as controlled by the PC 10.

In addition, the condenser assembly 26 further includes a condenser group 33 which is connected to or released from the condenser 31 by a switch and is capable of switching the condenser assembly capacity. This condenser group 33 is configured by connecting multiple condensers in parallel.

The PC 10 controls the overall solar simulator 1. Also, the PC 10 is functionally equipped with a correcting section 3. Functionality of this correcting section 3 is achieved by software operation. Concrete functions of the PC 10 and concrete functions of the correcting section 3 will be described in detail later.

The controller 12, by driving the switch of the power switching element 20 provided at a downstream (earth-connecting) side of the xenon lamp 14, controls the amount of electric current discharged from the condenser assembly 26 and flowing through the xenon lamp 14. This controller 12 for example is configured by DSP (digital signal processor). Concrete functions of the controller 12 will be described later.

The power switching element 20, for example, is configured by IGBT (insulated gate bipolar transistor). Also, the power switching element 20 may be such as a power transistor and a power MOSFET.

In addition, a resistance 22 is arranged in parallel to the power switching element 20 so that a certain amount of electric current flows through the xenon lamp 14 even if the power switching element 20 is off.

Figure 2:
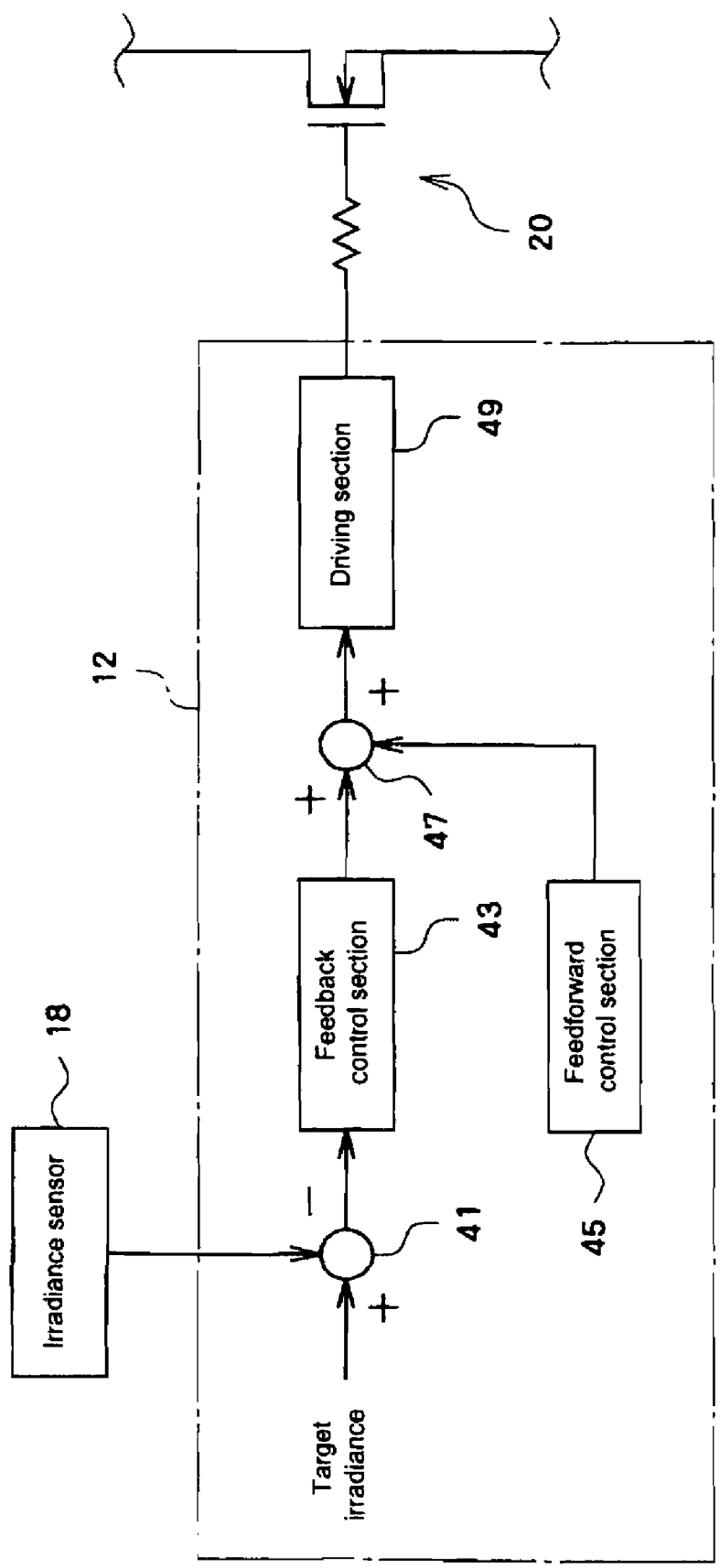
FIG. 2 is a view illustrating the example of the function configuration of the controller.

FIG. 2 shows an example of functional configuration of the controller 12. The controller 12 is functionally equipped with a first summation section 41, a feedback control section (hereinafter FB control section) 43, a feedforward control section (hereinafter FF control section) 45, a second summation section 47, and a driving section 49. These functional configurations are carried out by performing as the controller 12 reads the program stored in a memory (not shown in the figures).

The first summation section 41 generates error signals indicating the difference of the degree between a target irradiance of the flash light F and a current irradiance detected by the irradiance sensor 18 and outputs the error signals to FB control section 43. The target irradiance of the flash light F is set by the PC 10. Here, the detected signals from the irradiance sensor 18 are converted into digital signals by an AD converter (not shown in the figures), which are input in the first summation section 41.

The FB control section 43 generates control signals to reduce the amount of the irradiation differences based on the error signals, which are input from the first summation section 41, and the control signals are output to a second summation section 47. Sensitivity function of the FB control section 43 is configured to define a point at which the amount of the irradiation difference becomes zero as a stable point and to have a gain corresponding to the amount of the irradiation difference. The sensitivity function of the FB control section 43 is set by the PC 10.

The FF control section 45, when the flash light F emitted from the xenon lamp 14 exceeds a threshold value, outputs the control signals to the second summation section 47 according to a control pattern stored in the memory (not shown in the figures). This control pattern is configured so that the flash light F maintains the target irradiance for a certain period of time, which is stored in the memory (not shown in the figures) via the PC 10. The control pattern will be explained in detail later.

Although this FF control section 45 regards the time when the irradiance of the flash light F that is emitted from the irradiance sensor 18 exceeds the threshold value as the time to perform the feedforward control (open loop control), occurrence of the feedforward control is not limited to that time, and for example, timing signals, which is indicating that the trigger signals are output, are configured to be received from the trigger circuit 16 or the PC 10, thereby regarding the receiving of the timing signals as the time to perform the feedforward control.

The second summation section 47 adds the control signals, which are output from the FB control section 43, and the control signals, which are output from the FF control section 45, to be output to the driving section 49.

The driving section, according to the control signals, which are input from the second summation section 47, performs the switching drive on the power switching element 20. More concretely, the driving section 49 changes a duty ratio of the pulse wave which is output in the power switching element 20 by a pulse width modulation (PWM), so as to control the amount of electric current flowing through the xenon lamp 14. The control signals, which are input from the second summation section 47, are corresponding to the duty ratio of the pulse wave.

FIG. 3 shows the irradiance waveform and the control pattern of the flash light F.

Figure 3A:
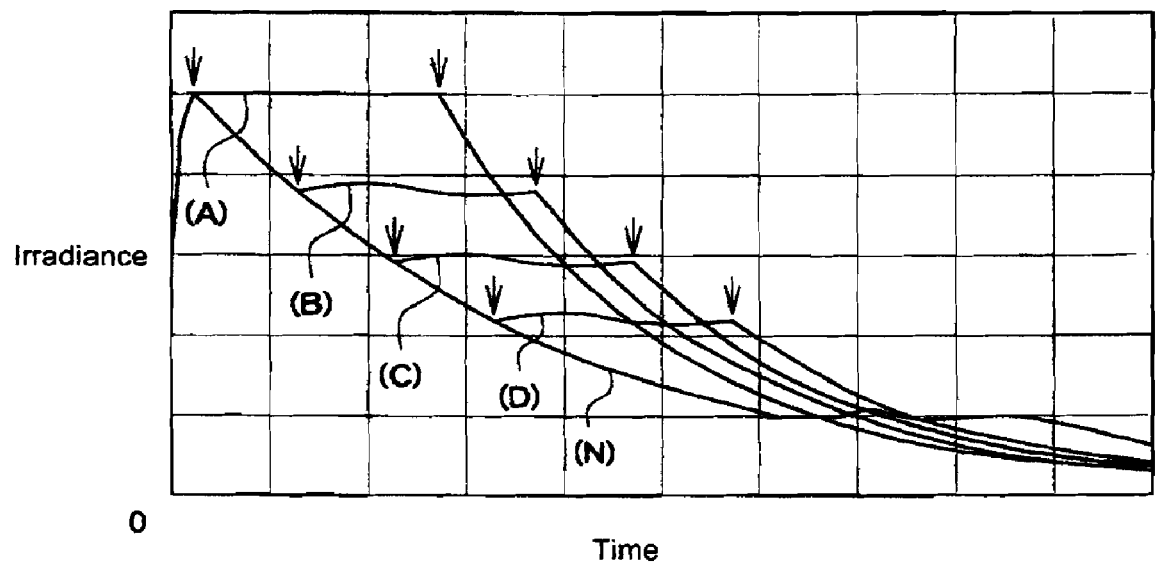
FIG. 3 is a graph showing the irradiance waveform and control pattern of the flash light.

FIG. 3(A) shows examples of the respective target irradiance waveforms (A-D) in this embodiment and the irradiance waveform (N) without electric current control. The axis of ordinate represents the irradiance of the flash light F, and the axis of abscissas represents time from emission of the flash light F.

Figure 3B:
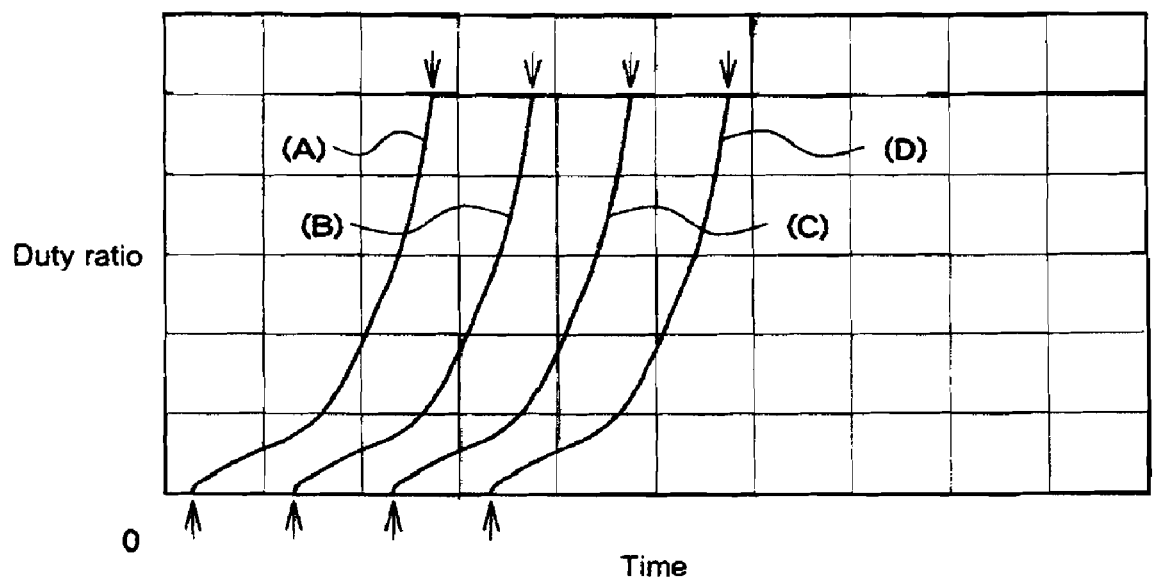

FIG. 3(B) shows examples of the respective control patterns (A-D) for carrying out the above-identified respective irradiance waveforms (A-D). The axis of ordinate represents a duty ratio of the pulse wave to be output to the power switching element 20 (i.e., control value to be output by the FF control section 45). Also, the axis of abscissas represents time from emission of the flash light F and corresponds to the axis of abscissas in the above-identified FIG. 3(A).

As shown in this FIG. 3(A), at the irradiance waveform (N), the irradiance of the flash light F rapidly rises from the emission of the irradiance of the flash light F, and upon reaching the maximum irradiance, the irradiance of the flash light F drops relative to exponential function. As such, the irradiance waveform (N) does not have a flat portion.

Comparing to the above-description, the irradiance of the flash light F in the respective waveform patterns (A-D) is constantly maintained during the periods between arrows as shown in FIG. 3(A). In the periods of constantly maintaining the irradiance, the examples of the respective control patterns (A-D) as shown in FIG. 3(B) shows that the duty ratio gradually increases as to the exponential function.

That is, the examples of the respective control patterns (A-D) as shown in FIG. 3(B) gradually increase the amount of electric current flowing though the xenon lamp 14 relative to the exponential function by gradually increasing the duty ratio relative to the exponential function from the timing of dropping until the target irradiance after the irradiance of the flash light F is reaching the maximum irradiance. Accordingly, the examples of the respective control patterns (A-D) has different timing for initiating the increase of the duty ratio depending upon the target irradiance. Due to such electric current control, reduction of the irradiance of the flash light F can be stopped at the target irradiance, and the period of the irradiance of the flash light F staying at the target irradiance can be extended. Such examples of the control patterns (A-D), for example, can be obtained experimentally.

In addition, the respective example of the control patters (A-D), after increasing the duty ratio up to the maximum value, completes the discharge of the xenon lamp 14 by maintaining the maximum duty ratio for a certain period of time.

The FF control section 45, by performing the feedforward control based on the above-explained examples of control patterns (A-D), can maintain the flash light F at the target irradiance for a certain period of time. Such feedforward control has quick reactivity, which facilitates the maintenance of the flash light F at the target irradiance.

Here, the FF control section 45 switches to an operation mode when the irradiance of the flash light F, which is detected by the irradiance sensor 18 as described above, exceeds the threshold value (i.e., before reaching the maximum irradiance) but is configured to stand by with the duty ratio being zero until the irradiance of the flash light F reaches the target irradiance based on the respective example of the control patterns.

The FB control section 43, while the FF control section 45 is gradually increasing the duty ratio (or during the period between the arrows as shown in the FIG. 3), performs the feedback control for the flash light F to be mainlined at the target irradiance. Such feedback control stabilizes the irradiance of the flash light F at the target irradiance.

As such, the characteristic measurement time of the photovoltaic devices can be secured. The PC 10, while the flash light F is being maintained at the target irradiance, measures the electric current voltage characteristics of the photovoltaic devices as operating the measuring unit 2.

Here, as described above, the condenser assembly 26 includes the condenser group 33 other than the condenser 31 and is configured to be able to switch the condenser assembly capacity. Accordingly, as the condenser group 33 is connected to the condenser 31 to increase the condenser capacity, the period of gradually increasing the duty ratio in the control pattern can be longer and the period of maintaining the irradiance of the flash light F can be longer than the case when using the condenser 31 alone.

Figure 4A:
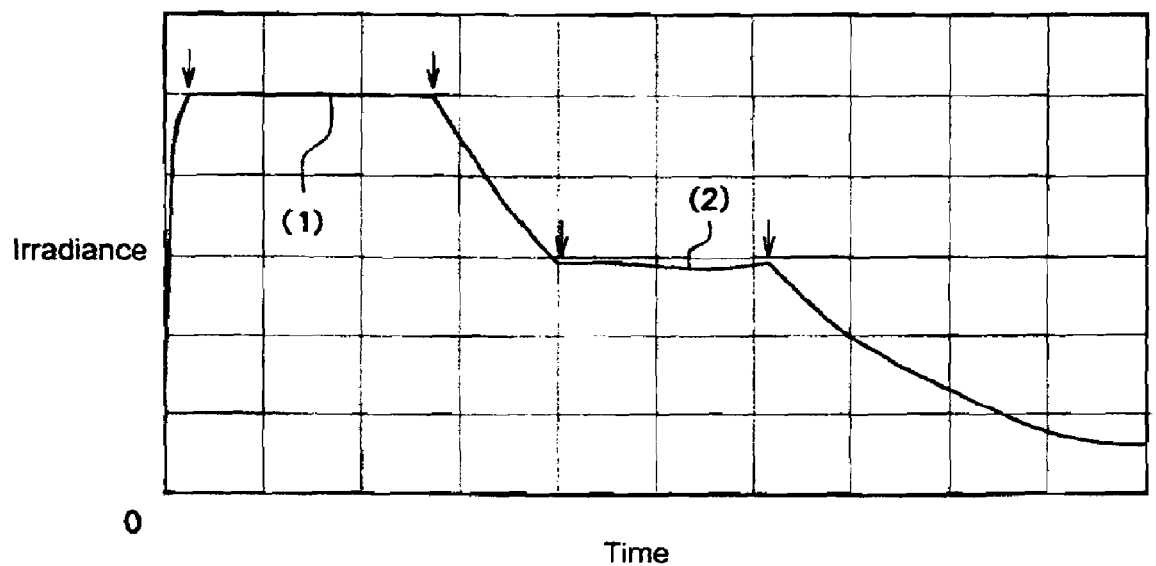
FIG. 4 is a graph showing the example of modification of the irradiance waveform of the flash light and the control pattern.
Figure 4B:
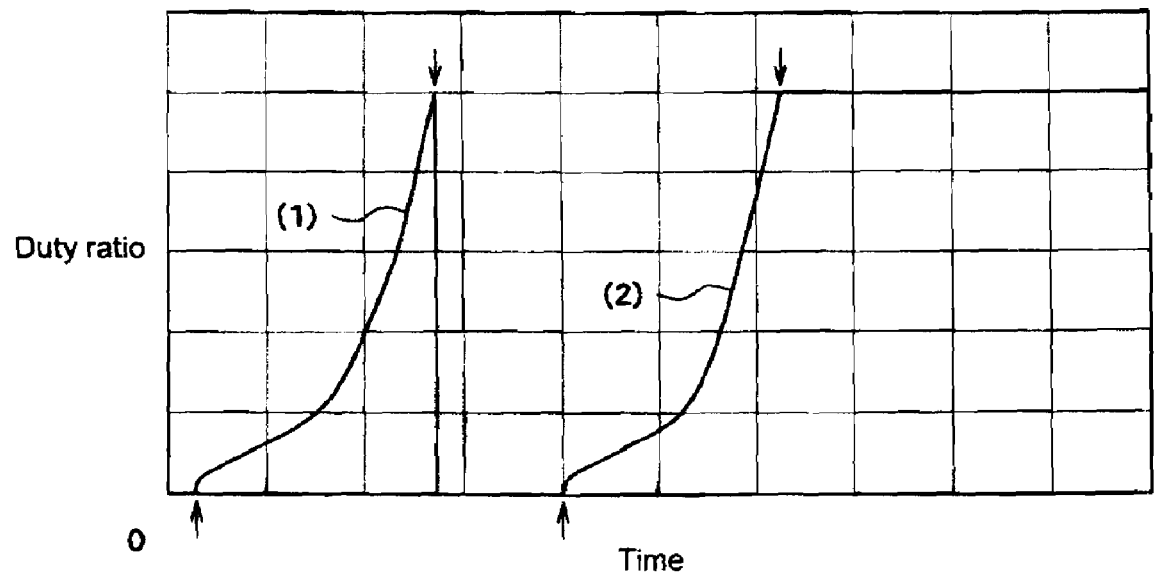

Next, examples of modification of the irradiance waveform of the flash light F and the control pattern are shown in FIG. 4. FIG. 4(A) is a modified example thereof, which shows the example of the target irradiance waveform in the present invention. FIG. 4(B) is an example of the control pattern to carry out this example of irradiance waveform.

In the example of the irradiance waveform shown in the FIG. 4(A), the irradiance of the flash light F is maintained in multiple periods (1) and (2) between the arrows shown in the same figure. That is, in this example of the irradiance waveform, after reaching the maximum irradiance of the irradiance of the flash light F, the irradiance of the flash light F is maintained at the first irradiance for a certain period of time and then is maintained at the second irradiance, which is lower than the first irradiance, for a certain period of time.

The example of the control pattern as shown in FIG. 4(B) shows that the duty ratio is gradually increased relative to the exponential function in the respective periods (1) and (2) of maintaining the irradiance. That is, the example of the control pattern shown in FIG. 4(B), after the irradiance of the flash light F reaches the maximum irradiance, gradually increases the duty ratio relative to the exponential function upon reaching the first irradiance, so that the irradiance of the flash light F can be maintained at the first irradiance. After maintaining the irradiance of the flash light F at the first irradiance, the duty ratio is returned to zero, and the irradiance of the flash light F is dropped once again. Then, when the irradiance of the flash light F reaches the second irradiance, the duty ratio is gradually increased relative to the exponential function so as to maintain the irradiance of the flash light F at the second irradiance.

The FF control section 45 can maintain the flash light F at the second irradiance, which is lower than the first irradiance, for a certain period of time by performing the feedforward control based on the example of the control pattern after the flash light F is maintained at the first irradiance for a certain period of time.

The FB control section 43 performs the feedback control in the respective periods (1) and (2) of gradually increasing the duty ratio by the FF control section 45. That is, FB control section 43 performs the feedback control so as to maintain the flash light F at the first irradiance in the period (1) and performs the feedback control so as to maintain the flash light F at the second irradiance in the period (2).

The PC 10 operates the measuring unit 2 to measure the characteristics of the electric current voltage of the photovoltaic devices in the respective periods (1) and (2) of maintaining the flash light F at the target irradiance. That is, the PC 10 operates the measuring unit 2 to measure the characteristics of the electric current voltage of the photovoltaic devices in the period (1) and then also operates the measuring unit 2 to measure the characteristics of the electric current voltage of the photovoltaic devices in the period (2). Accordingly, multiple measurements of the characteristics with different irradiation conditions become possible.

An example of the correction of the control pattern will be explained next. The correcting section 3 corrects the control pattern which is set in the controller 12 based on the past control history of the controller 12.

The driving pattern (actual driving pattern) of actually driving the power switching element 20 by the controller 12 is utilized as the past control history of the controller 12. This actual driving pattern is a control signal pattern obtained by the second summation section 47 adding the control signals which are output by the FB control section 43 as shown in the above-illustrated FIG. 2 and the control signals which are output by the FF control section 45.

That is, relative to the control signals of the FF control section 45 which performs the feedforward control according to the control pattern, the actual driving pattern of adding the control signals of the FB control section 43 which performs the feedback control corresponding to the detected irradiance is effective to obtain the target irradiance waveform, and therefore this embodiment uses this actual driving pattern for correcting the control pattern.

The controller 12 outputs the actual driving pattern to the correcting section 3 whenever performing the irradiance control of the flash light F (electric current control of the xenon lamp 14). The correcting section 3 corrects the control pattern based on the actual driving pattern which is input from the controller 12, and the corrected control pattern is set in the controller 12. The correction of the control pattern can be performed by adjusting the control pattern to be regarded as the basis and the actual driving pattern obtained from the past control in a predetermined ratio.

Concretely, the correcting section 3 determines a new control pattern $U(t)_{\_new}$ to be set in the controller 12 by calculating the following equation 1.

$$U(t)_{\_new} = \tau \cdot U(t)_{\_old} + (1-\tau) \cdot W(t)_{\_old} \quad \text{[Equation 1]}$$

Here, $U(t)_{\_old}$ is the control pattern which is previously set in the controller 12. In this embodiment, $U(t)_{\_old}$ is the control pattern which is set in the controller 12 last time. $W(t)_{\_old}$ is the actual driving pattern which indicates the previous control history of the controller 12. In this embodiment, $W(t)_{\_old}$ is the actual driving pattern of the last control of the controller 12.

Also, $\tau$ is a coefficient of the value from 0 to 1 and determines the ratio between the control pattern $\tau \cdot U(t)_{\_old}$ which is previously set in the controller 12 and the actual driving pattern $W(t)_{\_old}$ which indicates the past control history of the controller 12. In addition, this $\tau$ may be configured to be set as evaluating the flatness of the irradiance waveform obtained by the past control. The flatness of the irradiance waveform, for example, can be determined by sum of square of the difference between the target irradiance and the current irradiance.

As such, by correcting the control pattern newly set in the controller 12 based on the actual driving pattern which indicates the past control history of the controller 12, the xenon lamp 14 can provide an appropriate control pattern to the controller 12 whenever performing the irradiance control of the flash light F (electric current control of the xenon lamp 14) regardless of the secular change of the xenon lamp 14.

Furthermore, the present invention is not limited to the above-embodiment, and the control pattern to be set in the controller 12 can be corrected based on the result of the past control of the controller 12. The irradiance waveform of the flash light F which can be obtained from the irradiance sensor 18 by the controller 12 actually driving the power switching element 20 can be used as the result of the past control of the controller 12. In this case, the controller 12 outputs the irradiance waveform of the flash light F, which can be obtained from the irradiance sensor 18, to the correcting section 3 whenever performing the irradiance control of the flash light F. The correcting section 3 corrects the control pattern based on the irradiance waveform which is input from the controller 12 and sets the corrected control pattern in the controller 12.

Figure 5:
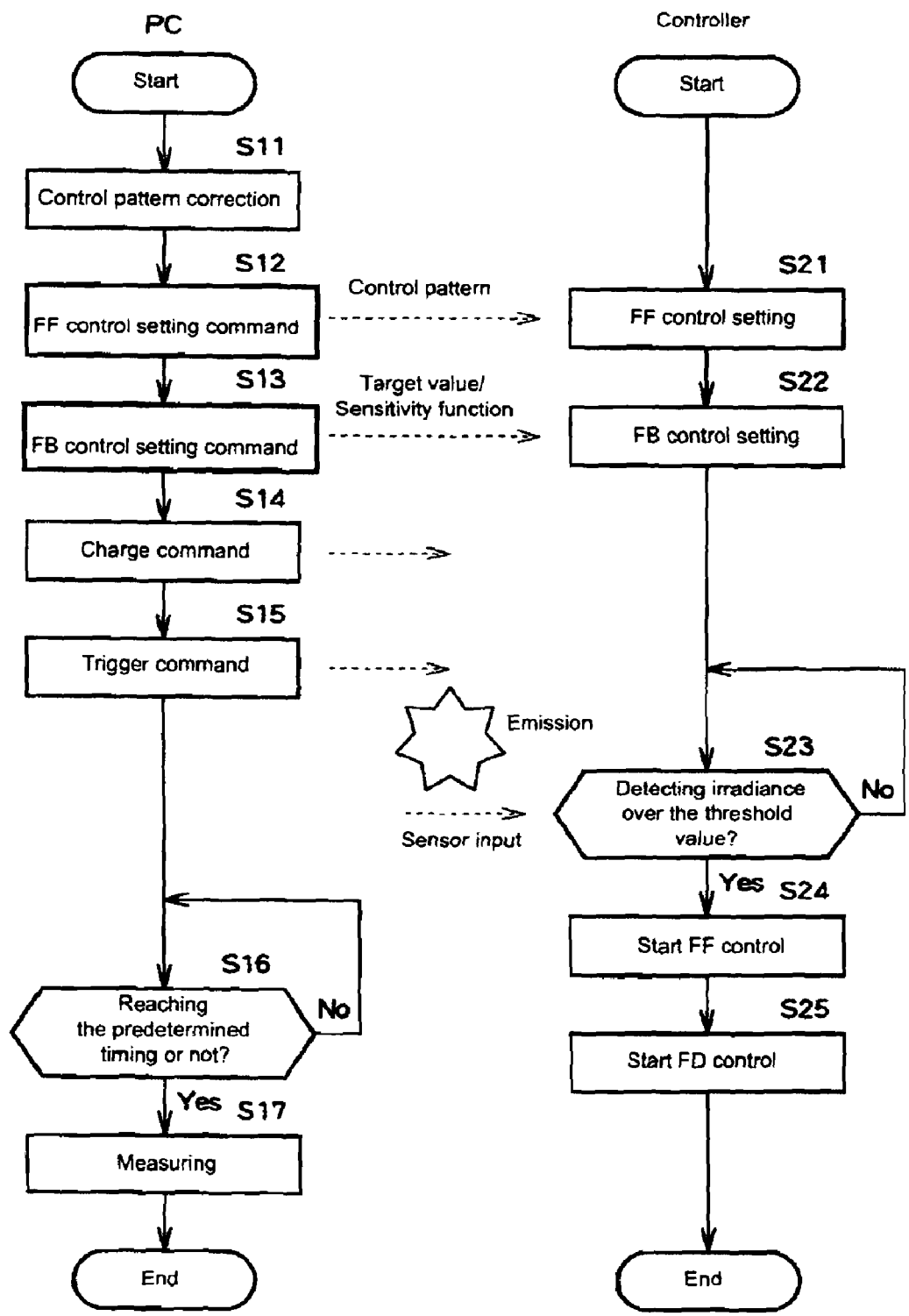
FIG. 5 is a flowchart showing an example of operation of the solar simulator relating to one embodiment of the present invention.

Next, an example of operation of the PC 10 and the controller 12 included in the solar simulator 1 is shown in the FIG. 5.

The PC 10 uses the function of the correcting section 3 to correct the control pattern to be set in the controller 12 based on the actual driving pattern which illustrates the past control history of the controller 12.

The PC 10 outputs the corrected control pattern in the controller 12 (S12). On the other hand, the controller 12 stores the control pattern which is input from the PC 10 in the memory (not shown in the figures) as the control pattern to be used in the feedforward control of the FF control section 45 (S21).

Also, the PC 10 outputs the target irradiance same as the target irradiance of the control pattern and the sensitivity function which is corresponding to the target irradiance to the controller 12 (S13). On the other hand, the controller 12 stores the target irradiance and the sensitivity function which are input from the PC 10 as the target irradiance and the sensitivity to be used for the feedback control of the FD control section 43 in the memory (not shown in the figures) (S22).

Then, the PC 10 outputs a charge command to the high voltage power source 24. The high voltage power supply 24 which receives this charge command accumulates in the condenser assembly 26 (S14).

In addition, the PC 10 outputs a trigger command to the trigger circuit 16. The trigger circuit 16, which receives the trigger command, outputs the trigger signals to the winding 64 wound around the xenon lamp 14 (S15).

Upon outputting the trigger signals from the trigger circuit 16 to the winding 64, the xenon lamp 14 starts to discharge to emit the flash light F. Here, the irradiance sensor 18 outputs the detected signals showing the irradiance of the flash light F to the controller 12.

The controller 12 switches to the operation condition when the irradiance of the flash light F exceeds the threshold value (S23: YES) and performs the feedforward control (S24) and the feedback control (S25).

Concretely, the controller 12 performs the feedforward control for the flash light F to maintain the target irradiance for a certain period of time by the function of the FF control section 45 according to the control pattern stored in the memory (not shown in the figures).

Furthermore, the controller 12 performs the feedback control for the flash light F to maintain the target irradiance for a certain period of time by the function of the FB control section 43 as utilizing the target value and the sensitivity function stored in the stored in the memory (not shown in the figures).

On the other hand, the PC 10 operates the measuring unit 2 at the predetermined timing to measure the characteristics of the electric current voltage (S16, S17). This timing is configured to measure the characteristics of the electric current voltage of the photovoltaic devices while the irradiance of the flash light F is being maintained at the target irradiance.

Also, the controller 12 may be configured to send a notice of condition for measuring possibility to the PC 10 at the time of the irradiance of the flash light F being maintained at the target irradiance, and the PC 10, upon receiving the notice, may operate the measuring unit 2.

Here, if the controller 12 is configured to have a setting of the control pattern for maintaining the irradiance of the flash light F at multiple periods (1) and (2) as shown in the above-described FIG. 4, the controller 12 performs the feedforward control to maintain the respective irradiance of the flash light F for a certain period of time at the respective periods (1) and (2) by the function of the FF control section 45

Furthermore, the controller 12 is configured to have a setting of the first and second irradiances as the target value and the sensitivity function corresponding to the first and second irradiances and performs the feedback control by the function of the FB control section 43 to maintain the respective irradiance of the flash light F at the respective periods (1) and (2).

In this case, the PC 10 operates the measuring unit 2 to measure the characteristics of the electric current voltage of the photovoltaic devices at the respective periods (1) and (2) where the irradiance of the flash light F is being maintained.

Also, the above-explained embodiments can be modified as follows.

The PC 10 may irradiate the flash light F to the photovoltaic devices multiple times and may operate the measuring unit 2 to measure the characteristics of the electric current voltage of the photovoltaic devices. For example, the measuring unit 2 determines an approximate value of the characteristics of the electric current voltage of the photovoltaic devices at the first flash light F (i.e., pre-flash), and the approximate value is utilized to perform an actual measurement of the characteristics of the electric current voltage of the photovoltaic devices at the second flash light F.

In addition, not only the flash light F from respectively corresponding xenon lamp 14 but also the flash light F from other xenon lamp 14 incidents in the respective irradiance sensor 18. Then, the controller 12, from the irradiance detected by the irradiance sensor 18, may determine the amount of contribution of the flash light F from the corresponding xenon lamp 14 to serve the electric current control (such as feedback control) of the corresponding xenon lamp 14. A contribution ratio of the flash light F, for example, can be pre-calculated such as by an experiment.

[Explanation of the Reference Numbers]

1. Solar simulator, 2. Measuring unit, 3. Correcting section, 10. Computer, 12. Controller, 14. Xenon lamp, 16. Trigger circuit, 18. Irradiance sensor 20. Power switching element, 22. Resistance, 24. High voltage power supply, 26. Condenser Assembly, 31. Condenser, 33. Condenser group, 41. First summation section, 43. Feedback control section, 45. Feedforward control section, 47. Second summation section, 49. Driving section, 64. Winding, F. Flash light While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A solar simulator for measuring current voltage characteristics of an object photovolantic device, comprising:
   a condenser assembly;
   a lamp which emits a flash light by electric current discharged from said condenser assembly; and
   a controller which performs feedforward control of the amount of electric current flowing through the lamp according to a preset control pattern for maintaining predetermined irradiance of the flash light for a predetermined period of time,
   said preset pattern showing an increase in the amount of electric current flowing through the lamp over time from the time when the flash light irradiance drops to a predetermined irradiance after reaching the maximum irradiance and showing more delay in the timing for initiating the increasing the amount of electric current flowing through the lamp when the flash light irradiance is lower.

2. The solar simulator according to claim 1, wherein
   said solar simulator further comprises a detector which detects the flash light irradiance, and
   said controller performs feedback control of the amount of electric current flowing through the lamp according to the detected irradiance for maintaining the predetermined flash light irradiance.

3. The solar simulator according to claim 2, further comprising a correcting section which corrects the control pattern based on the past control history of the controller.

4. The solar simulator according to claim 2, wherein said control pattern is configured to increase the amount of electric current flowing through the lamp over time from the time when the flash light irradiance drops to a predetermined irradiance after reaching the maximum irradiance.

5. The solar simulator according to claim 2, wherein said control pattern is configured to maintain the flash light at a first irradiance for a predetermined period of time and then to maintain the flash light at a second irradiance with lower irradiance than the first irradiance for a predetermined period of time.

6. The solar simulator according to claim 2, wherein said controller performs switching control of a power switching element arranged in an electric current path including the lamp.

7. The solar simulator according to claim 2, wherein the condenser assembly is capable of switching a condenser assembly capacity.

8. The solar simulator according to claim 1, further comprising
a correcting section which corrects the control pattern based on the past control history of the controller.

9. The solar simulator according to claim 1, wherein said control pattern is configured to maintain the flash light at a first irradiance for a predetermined period of time and then to maintain the flash light at a second irradiance with lower irradiance than the first irradiance for a predetermined period of time.

10. The solar simulator according to claim 1, wherein said controller performs switching control of a power switching element arranged in an electric current path including the lamp.

11. The solar simulator according to claim 1, wherein the condenser assembly is capable of switching a condenser assembly capacity.

* * * * *